United States Patent
Takahashi

(10) Patent No.: US 11,428,653 B2
(45) Date of Patent: Aug. 30, 2022

(54) X-RAY ANALYSIS SYSTEM AND X-RAY ANALYSIS METHOD

(71) Applicant: JEOL Ltd., Tokyo (JP)

(72) Inventor: Hideyuki Takahashi, Tokyo (JP)

(73) Assignee: JEOL Ltd., Tokyo (JP)

( * ) Notice: Subject to any disclaimer, the term of this patent is extended or adjusted under 35 U.S.C. 154(b) by 192 days.

(21) Appl. No.: 16/897,781

(22) Filed: Jun. 10, 2020

(65) Prior Publication Data

US 2020/0393393 A1 Dec. 17, 2020

(30) Foreign Application Priority Data

Jun. 14, 2019 (JP) .............................. JP2019-111076

(51) Int. Cl.
*G01N 23/2252* (2018.01)
*G01N 23/2209* (2018.01)

(52) U.S. Cl.
CPC ..... *G01N 23/2252* (2013.01); *G01N 23/2209* (2018.02); *G01N 2223/079* (2013.01); *G01N 2223/507* (2013.01)

(58) Field of Classification Search
CPC .......... G01N 23/2252; G01N 23/2209; G01N 2223/079; G01N 2223/507; G01N 2223/304; G01N 2223/418; G01N 23/2251
See application file for complete search history.

(56) References Cited

U.S. PATENT DOCUMENTS

| 8,247,769 | B2* | 8/2012 | Zewail | ..................... H01J 37/26 250/311 |
| 2002/0158200 | A1* | 10/2002 | Terauchi | ............... H01J 37/256 250/310 |
| 2008/0067379 | A1* | 3/2008 | Notoya | .............. G01N 23/2209 250/310 |
| 2010/0108883 | A1* | 5/2010 | Zewail | .................. H01J 37/263 250/307 |
| 2017/0102623 | A1* | 4/2017 | Pisarenco | ............ G01N 23/201 |
| 2019/0017946 | A1* | 1/2019 | Wack | ................... G01N 23/201 |
| 2019/0212281 | A1* | 7/2019 | Shchegrov | ........... G01N 23/223 |
| 2020/0393393 | A1* | 12/2020 | Takahashi | .......... G01N 23/2252 |

FOREIGN PATENT DOCUMENTS

| JP | 10111261 A | 4/1998 |
| JP | 2002329473 A | 11/2002 |
| JP | 3577281 B2 | 7/2004 |

(Continued)

OTHER PUBLICATIONS

Office Action issued in JP2019111076 dated May 25, 2021.

(Continued)

*Primary Examiner* — David A Vanore
(74) *Attorney, Agent, or Firm* — The Webb Law Firm

(57) ABSTRACT

Three ROIs, ROI-c, ROI-d, and ROI-e, are set for an Lα peak and an Lβ peak reflecting an electron state of a valance band. Accumulated values in the ROI-c, ROI-d, and ROI-e are respectively normalized with reference to an accumulated value in an ROI-a, to determine a sample vector. The sample vector is compared to a plurality of compound vectors corresponding to a plurality of compounds, and a compound forming the sample is estimated based on a compound vector having the highest similarity.

5 Claims, 7 Drawing Sheets

(56) References Cited

FOREIGN PATENT DOCUMENTS

| | | |
|---|---|---|
| JP | 2007218683 A | 8/2007 |
| WO | 2010022409 A2 | 2/2010 |

OTHER PUBLICATIONS

Extended European Search Report issued in EP 20177578.0 dated Nov. 26, 2020.
Terauchi and Kawana, Soft-X-ray emission spectroscopy based on TEM—Toward a total electronic structure analysis, Ultramicroscopy, 2006, vol. 106, pp. 1069-1075.
Terauchi et al., Chemical Analysis with Soft-X-ray Emission Spectroscopy Based on SEM, Surface Science, 2015, vol. 36, No. 4, pp. 184-188.

* cited by examiner

X-RAY ANALYSIS SYSTEM AND X-RAY ANALYSIS METHOD

CROSS REFERENCE TO RELATED APPLICATION

This application claims priority to Japanese Patent Application No. 2019-111076 filed on Jun. 14, 2019 the disclosure of which is hereby incorporated by reference in its entirety.

BACKGROUND

Field of the Invention

The present disclosure relates to an X-ray analysis system and an X-ray analysis method, and in particular, to analysis of a sample based on an X-ray spectrum.

Description of Related Art

Various systems are proposed as X-ray analysis systems. For example, a system is known in which an electron beam is irradiated onto a sample, and an X-ray (characteristic X-ray) emitted from the sample as a result of the irradiation of the electron beam is measured. In this system, the sample is analyzed by analyzing a spectrum of the measured X-ray.

For example, as an X-ray analyzer attached to a scanning electron microscope (SEM), there are known a wavelength dispersive X-ray analyzer and an energy dispersive X-ray analyzer. With regard to the former, the wavelength dispersive X-ray analyzer obtains an X-ray spectrum by directing an X-ray emitted from the sample to a diffraction grating, producing an X-ray component for each wavelength using the diffraction grating, and sequentially detecting the X-ray components.

In a typical wavelength dispersive X-ray analyzer, a diffraction grating and an X-ray detector must be moved, and thus, it is not possible to simultaneously detect multiple wavelengths. In consideration of this, a soft X-ray spectrometer of a type allowing simultaneous detection of multiple wavelengths is proposed (refer to M. Terauchi et al., Chemical State Analysis with Soft-X-ray Emission Spectroscopy Based on SEM, Surface Science, Vol. 36, No. 4, pp. 184-188, 2015). This apparatus comprises a diffraction grating having a wavelength dispersing function, and a detector which detects an X-ray which spatially spreads after the diffraction, and can detect at once all of X-ray components over a certain wavelength range. The apparatus has a high energy resolution, and an effective usage thereof in the future is highly expected.

An electron state in a valence band changes according to a form of chemical bonding between atoms. Thus, if the electron state in the valence band can be observed, information reflecting the chemical bonding between the atoms; that is, information characteristic to the compound, can be obtained. Although it is difficult to directly observe the electron state in the valence band, it is possible to observe an X-ray generated due to an electron transition from the valence band which is an outer shell (outermost shell) to an inner shell (or inner shells). For example, with the use of the above-described high-resolution soft X-ray spectrometer, information reflecting the electron state in the valence band can be obtained, and can be utilized for analysis of the sample. The X-ray spectrum also includes peak(s) caused by electron transition(s) between inner shells, and the use of the information obtained therefrom is also desired.

An advantage of the present disclosure lies in enabling highly precise analysis of a sample. Alternatively, an advantage of the present disclosure lies in use of information reflecting electron transition(s) from the valence band to the inner shell(s) in an analysis of a sample.

SUMMARY OF THE INVENTION

According to one aspect of the present disclosure, there is provided an X-ray analysis system comprising: a production apparatus; and an analysis apparatus. The production apparatus produces a spectrum for an X-ray emitted from a sample. The spectrum includes a first peak caused by an electron transition from a valence band corresponding to an outer shell to an inner shell, and a second peak caused by an electron transition between inner shells. The analysis apparatus is an apparatus which analyzes the sample based on the spectrum. The analysis apparatus comprises: a calculator which calculates characteristic information reflecting a chemical bonding in the sample based on the spectrum; and an analyzer which analyzes the sample based on the characteristic information.

A form, a position, or the like of the first peak changes according to an electron state of the valence band. In other words, the first peak reflects the chemical bonding. Thus, based at least on the first peak, and desirably, based on the first peak and the second peak, characteristic information for analyzing the sample is calculated. The second peak is normally stably caused, and, in alternative configurations, the second peak is used as a reference for normalization. Alternatively, a position and an intensity of the second peak may be taken as independent feature quantities.

According to another aspect of the present disclosure, the analysis apparatus further comprises a setter which sets, on the spectrum, a first region of interest for evaluating the first peak and a second region of interest for evaluating the second peak. The calculator calculates the characteristic information by normalizing information in the first region of interest with reference to information in the second region of interest. With the normalization, it becomes possible to accurately analyze the sample independent of an intensity of the X-ray. The information in the region of interest is, for example, an accumulated value of the intensity.

According to another aspect of the present disclosure, the spectrum includes a plurality of the first peaks caused by electron transitions from the valence band corresponding to the outer shell to the inner shells. The setter sets a plurality of the first regions of interest for evaluating the plurality of the first peaks, and the calculator calculates the characteristic information by normalizing a plurality of the information in the plurality of the first regions of interest with reference to the information in the second region of interest. With the use of the plurality of information reflecting the electron state in the valence band, analysis precision can be improved. According to another aspect of the present disclosure, the analyzer identifies a compound forming the sample based on the characteristic information. Alternatively, a chemical bonding or a chemical structure in the sample may be analyzed.

According to another aspect of the present disclosure, an electron beam is irradiated onto the sample for obtaining the X-ray, and the X-ray is a soft X-ray having an energy of lower than or equal to 1 keV. The production apparatus includes a wavelength dispersing element onto which the X-ray is irradiated, and a detector which detects a dispersive X-ray which is output from the wavelength dispersing element and which spatially spreads.

According to another aspect of the present disclosure, there is provided an X-ray analysis method comprising the steps of: irradiating an electron beam onto a sample; producing a spectrum for an X-ray emitted from the sample; and analyzing the sample based on the spectrum. The spectrum includes a plurality of peaks of interest (a plurality of first peaks) caused by electron transitions from a valence band corresponding to an outer shell to inner shells. In the step of analyzing the sample, characteristic information reflecting a chemical bonding in the sample is calculated based on the plurality of peaks of interest, and the sample is analyzed based on the characteristic information. Desirably, in the analysis of the sample, a reference peak (second peak) included in the spectrum is further used.

The analyzing step may be realized as a function of hardware or a function of software. In the case of the latter, a program which executes the analyzing step is installed in an information processor via a transportable recording medium or via a network. A concept of the information processor encompasses a computer, a spectrum processing device, a sample analysis apparatus, and the like.

BRIEF DESCRIPTION OF DRAWINGS

Embodiment(s) of the present disclosure will be described based on the following figures, wherein.

DESCRIPTION OF THE INVENTION

An embodiment of the present disclosure will now be described with reference to the drawings.

Figure 1:
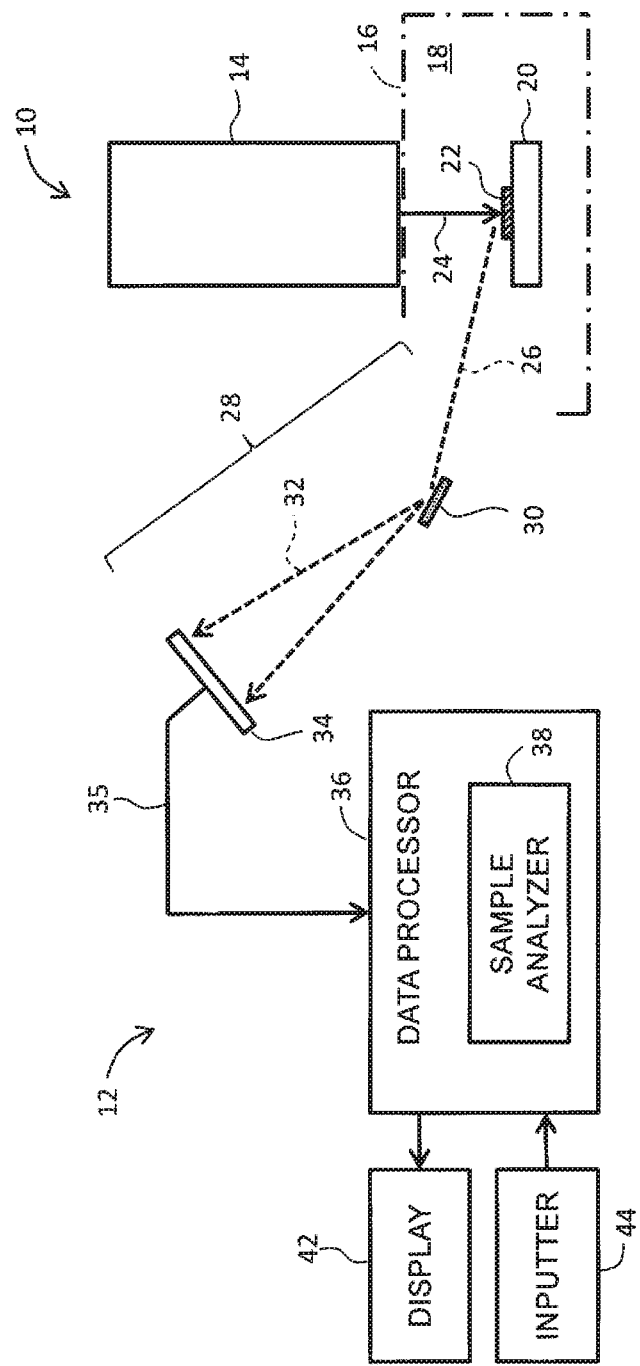
FIG. 1 is a block diagram showing an X-ray analysis system according to an embodiment of the present disclosure.

FIG. 1 shows an X-ray analysis system according to an embodiment of the present disclosure. The X-ray analysis system is a system which analyzes a compound which forms a sample. In addition, a quantitative analysis may be executed, or an electron state in a valence band may be directly evaluated. In the illustrated example structure, the X-ray analysis system comprises a scanning electron microscope 10, an information processor 12, and a wavelength dispersive soft X-ray spectrometer 28. Alternatively, in place of the scanning electron microscope 10, an electron beam apparatus such as an electron probe microanalyzer may be provided.

The scanning electron microscope 10 comprises a lens barrel 14 and a base 16. The lens barrel 14 comprises an electron gun, a deflection scanning lens, an objective lens, or the like, and produces an electron beam 24. The base 16 has a housing which surrounds a sample chamber 18. A stage 20 is placed in the sample chamber 18, and a sample 22 is held by the stage 20. The sample 22 is, for example, a transition metal. The electron beam 24 is irradiated onto a particular position on the sample 22. With this configuration, an X-ray 26 is emitted from the sample 22. In the present embodiment, the X-ray 26 to be observed is, for example, a soft X-ray having an energy of lower than or equal to 1 keV. Alternatively, an upper limit of an observation band may be an energy higher than 1 keV.

The soft X-ray spectrometer 28 functions as a production apparatus or a production means. Specifically, the soft X-ray spectrometer 28 is a wavelength dispersive spectrum measurement apparatus, and comprises a focusing mirror (not shown), a wavelength dispersing element (diffraction grating) 30, and a detector 34. The wavelength dispersing element 30 has a function to decompose multiple wavelength components of the soft X-ray 26, and has a predetermined groove array in which a pitch changes continuously. The multiple wavelength components decomposed by the wavelength dispersing element 30 form dispersive X-rays 32 which spatially spread, and which are simultaneously detected by the detector 34. The detector 34 comprises a plurality of detection elements arranged two-dimensionally, and is formed from, for example, a CCD (Charge Coupled Device). An output signal of the detector 34 corresponds to information showing a spectrum. With the soft X-ray spectrometer 28 shown in FIG. 1, the soft X-ray can be observed with a high energy resolution. Alternatively, a plurality of wavelength dispersing elements may be prepared, and a wavelength dispersing element to be actually used may be selected from these elements.

The information processor 12 comprises a data processor 36, a display 42, and an inputter 44. The data processor 36 functions as an analysis apparatus or an analysis means. The data processor 36 is formed from a processor, and more specifically, is formed from a CPU which executes a program. The data processor 36 has a memory which stores the program and a library for the analysis. The data processor 36 has a sample analyzing function. This function is shown in FIG. 1 as a sample analyzer 38. The sample analyzer 38 identifies a compound forming the sample based on the spectrum of the soft X-ray. As will be described below, the spectrum includes a plurality of peaks caused by electron transitions from a valence band corresponding to an outer shell to inner shells (a plurality of first peaks, or a plurality of peaks of interest), and a plurality of peaks caused by electron transitions between the inner shells (a plurality of second peaks, or a plurality of reference peaks). Each peak of interest reflects an electron state in the valence band; that is, a chemical bonding. For example, a difference in the electron state may be observed as a difference in a peak form. The peaks caused by the electron transitions between the inner shells are stably caused, and in the present embodiment, these peaks are used as references for normalization.

Figure 2:
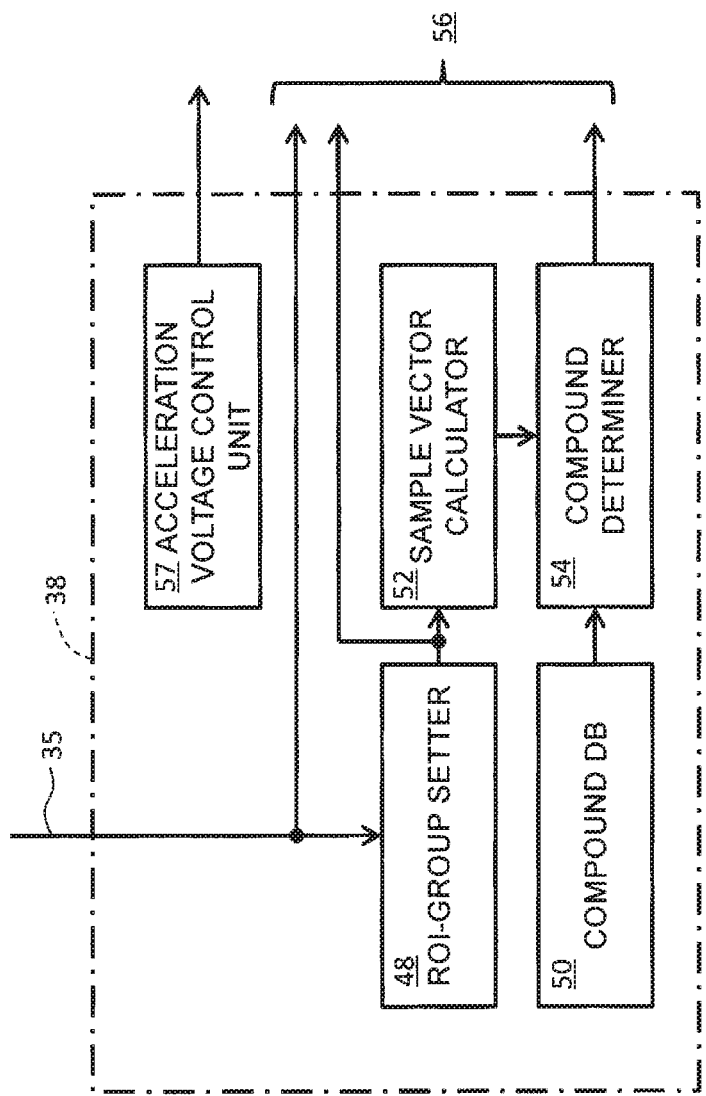
FIG. 2 is a block diagram showing an example structure of a sample analyzer.

FIG. 2 shows an example structure of the sample analyzer 38. An ROI group setter 48 functions as a setting means, and sets a group of ROIs including a plurality of ROIs (regions of interest) on a spectrum 35, for extracting, from the spectrum 35, a plurality of feature quantities representing the spectrum 35. The plurality of ROIs are set such that the electron state in the valence band is reflected in the plurality of feature quantities.

A sample vector calculator 52 functions as a calculating means, and calculates the plurality of feature quantities from the plurality of ROIs. More specifically, for each ROI, spectrum portions included therein are accumulated, to calculate an accumulated value. In actual practice, a sample vector is calculated by normalizing an accumulated value of the plurality of peaks of interest based on an accumulated value of peaks caused by the electron transitions between the inner shells (reference peaks). The sample vector corresponds to, for example, an arrangement of three accumulated values which are normalized.

A compound database 50 functions as a compound library. The compound database 50 includes a plurality of compound vectors corresponding to a plurality of compounds. A compound determiner 54 functions as a compound analyzer or a compound analysis means, and identifies a compound forming the sample by matching the sample vector with respect to the plurality of compound vectors. A determination result is displayed on the display through a display processor 56. The display displays, in addition to the determination result, the spectrum, the plurality of ROIs, or the like. A measurement condition or the like is set by a user using the inputter described above. An accelerating voltage control unit 57 controls an accelerating voltage of the electron beam. With the control of the accelerating voltage, a depth of observation in the sample can be controlled.

Figure 3:
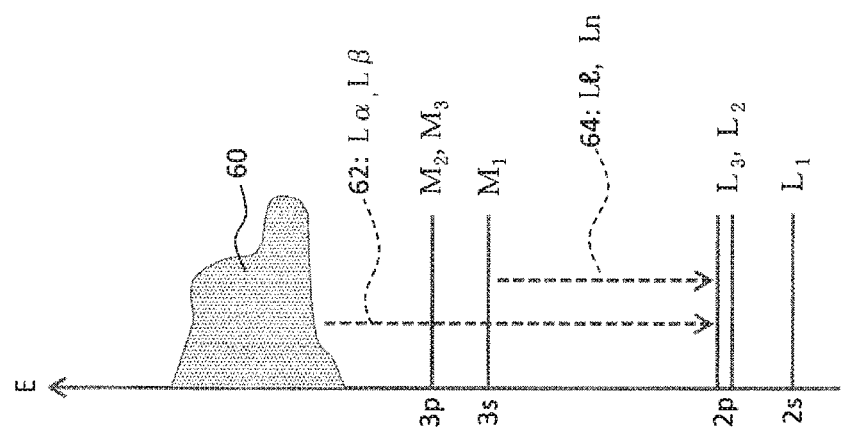
FIG. 3 is a diagram for explaining an electron transition.

FIG. 3 shows an energy state of electrons. A vertical axis shown an energy level, and a horizontal axis shows a state density. Reference numeral 62 shows an electron transition from a valence band 60 to an L shell (2p orbital). Here, an electron transition from the valence band 60 to an L3 shell is shown as Lα, and an electron transition from the valence band to an L2 shell is shown as Lβ. Reference numeral 64 shows an electron transition from an M shell (3s orbital) to the L shell (2p orbital). Here, an electron transition from the valence band 60 to the L3 shell is shown as L1, and an electron transition from the valence band to the L2 shell is shown as Ln. Peripheral atoms affect the electron state in the valence band 60. That is, the electron state reflects the chemical bonding. In the present disclosure, alternative expressions may be employed in some cases, for expressing the symbols showing the electron transitions.

Figure 4:
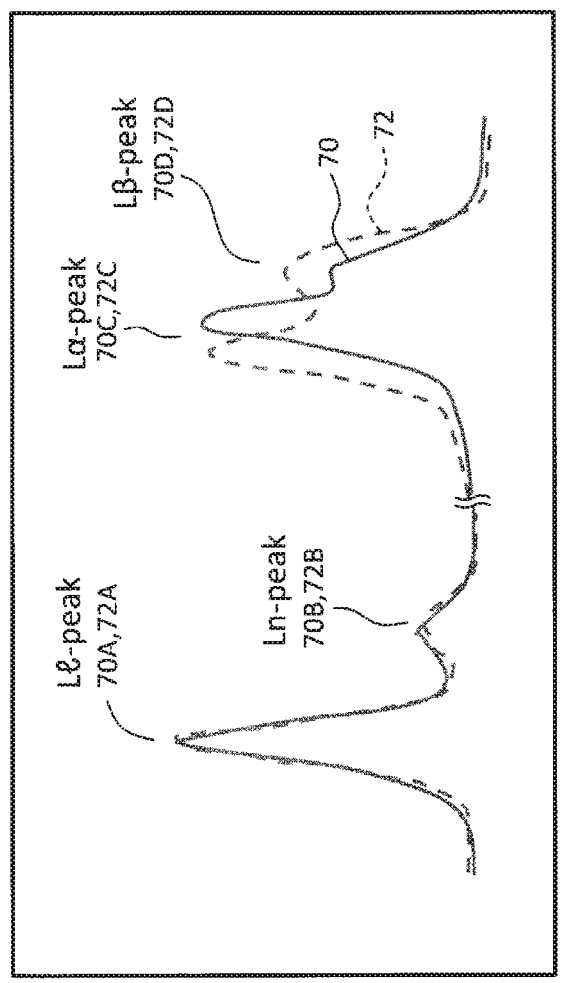
FIG. 4 is a diagram showing an X-ray spectrum.

FIG. 4 exemplifies a spectrum observed by the sample analysis system shown in FIG. 1. An observed energy range is, for example, greater than or equal to 45 eV and lower than or equal to 1 keV.

More specifically, FIG. 4 shows a first spectrum 70 and a second spectrum 72 observed for two samples partially having different structures (for example, transition metals differing only in an electron configuration type). The first spectrum 70 has an L1 peak 70A and an Ln peak 70B at a lower range side, and an Lα peak 70C and an Lβ peak 70D at a higher range side. Similarly, the second spectrum 72 has an L1 peak 72A and an Ln peak 72B at a lower range side, and an Lα peak 72C and an Lβ peak 72D at a higher range side. The Lα peaks 70C and 72C and the Lβ peaks 70D and 72D may be considered as having forms (and positions) respectively reflecting the electron states of the valence band. On the other hand, the L1 peaks 70A and 72A and the Ln peaks 70B and 72B may be considered to be caused relatively stably. In fact, when the first spectrum 70 and the second spectrum 72 are compared to each other, it can be seen that there is almost no difference between the L1 peak 70A and the L1 peak 72A and between the Ln peak 70B and the Ln peak 72B. On the other hand, significant differences exist between the Lα peak 70C and the Lα peak 72C and between the Lβ peak 70D and the Lβ peak 72D.

Figure 5:
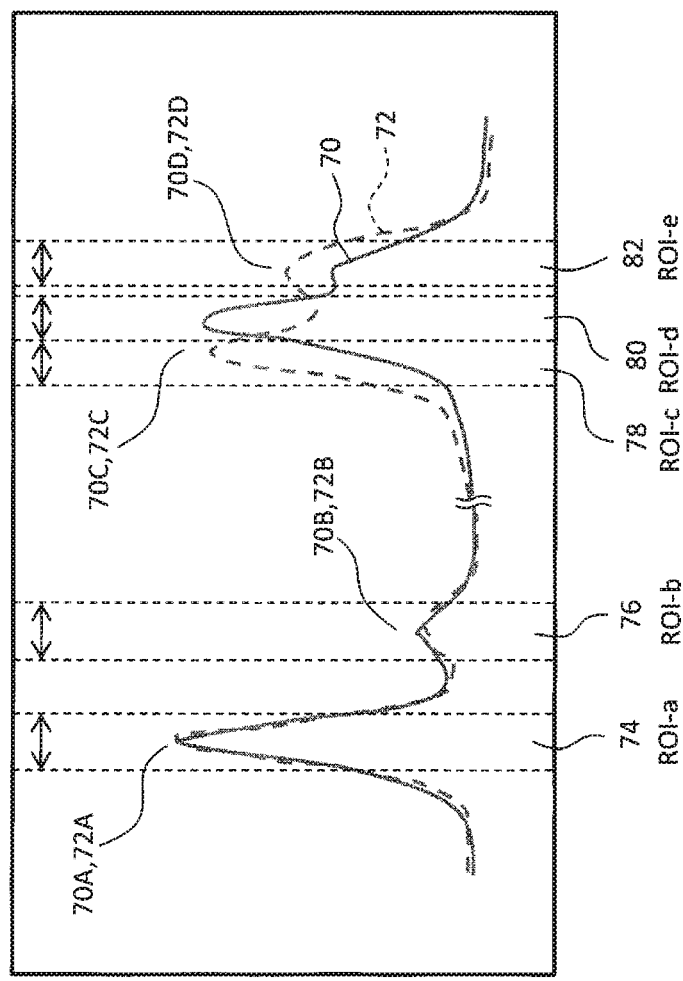
FIG. 5 is a diagram showing a group of ROIs which are set for an X-ray spectrum.

As shown in FIG. 5, in the present embodiment, in order to evaluate a spectrum to be analyzed, for example, 5 predetermined ROIs, ROI-a 74~ROI-e 82, are set. The ROI-a 74 covers the L1 peaks 70A and 72A, and the ROI-b 76 covers the Ln peaks 70B and 72B. The remaining three ROIs, which are adjacent to each other or which are densely packed, ROI-c 78~ROI-e 82, cover the Lα peaks 70C and 72C and the Lβ peaks 70D and 72D. By setting three ROIs for two peaks, the form and positional relationship can be specifically evaluated.

In the present embodiment, of the ROI-a 74 and the ROI-b 76, only the ROI-a 74 is actually used. Specifically, an accumulated value in the ROI-a 74 is used as a numerical value for normalization.

Figure 6:
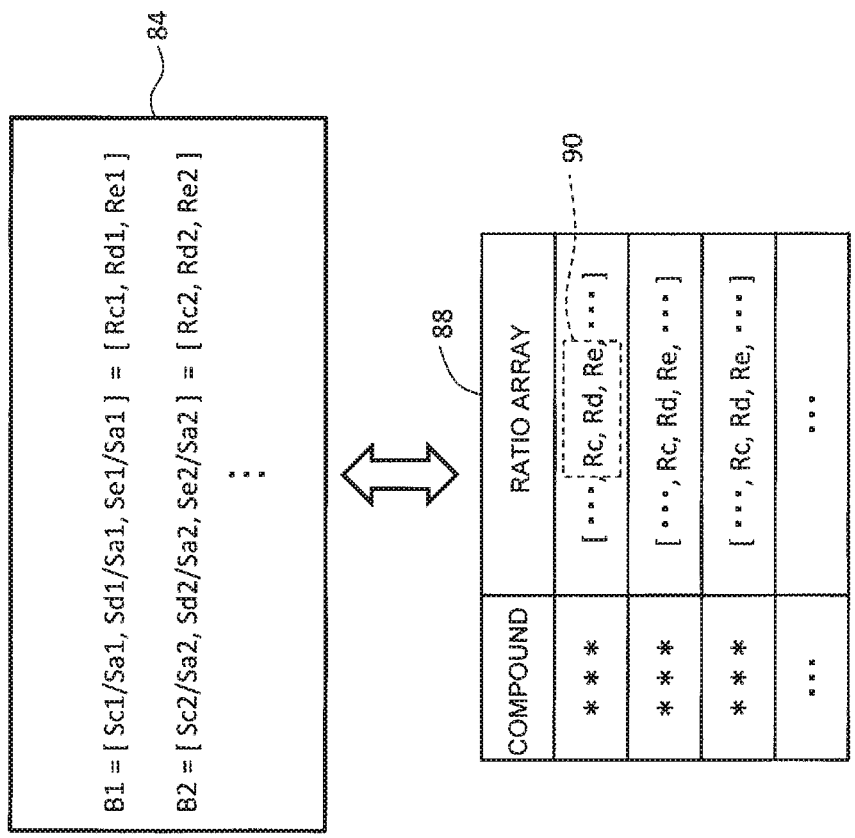
FIG. 6 is a diagram showing a method of identifying a compound based on a sample vector.

With reference to FIG. 6, the configuration will be more specifically described. With respect to the first spectrum, when the accumulated value in the ROI-a is Sa1, and three accumulated values in three ROIs, ROI-c~ROI-e, are Sc1, Sd1, and Se1, the values Sc1, Sd1, and Se1 are divided by Sa1, to obtain three ratios, Rc1, Rd1, and Re1. These ratios form a first sample vector B1 (refer to a box 84). The accumulated value is determined by accumulating a plurality of intensities in the ROI, and corresponds to an area. Similarly, with respect to the second spectrum, when the accumulated value in the ROI-a is Sa2 and three accumulated values in the three ROIs, ROI-c~ROI-e, are Sc2, Sd2, and Se2, the values Sc2, Sd2, and Se2 are divided by Sa2, to obtain three ratios, Rc2, Rd2, and Re2. These ratios form a second sample vector B2 (refer to the box 84).

A compound database 88 stores a plurality of ratio arrays corresponding to a plurality of compounds. Each ratio array includes a plurality of ratios corresponding to the plurality of ROIs. Among these, a plurality of ratios corresponding to the plurality of ROIs which are actually taken into consideration form a compound vector 90, which serves as a comparison target. The sample vector is compared with a plurality of compound vectors, and a compound vector having the highest similarly is selected, so that identification of the compound forming the sample is enabled. As a method of evaluating the similarity, any of various known methods may be used. For example, a difference or a norm between vectors may be calculated.

Alternatively, the Ln peak may be employed as the peak for normalization, in place of the L1 peak. Alternatively, four or more ROIs may be set over an entirety of a range including the Lα peak and the Lβ peak. Alternatively, in place of the accumulated value, other values may be used, such as a peak energy, a peak relative level, a half width, or the like. In order to enable evaluation of the peak waveform, more specifically, the electron state, it is desirable to select a representative value or a feature quantity. The calculation method and the contents of the database shown in FIG. 6 are merely exemplary.

Figure 7:
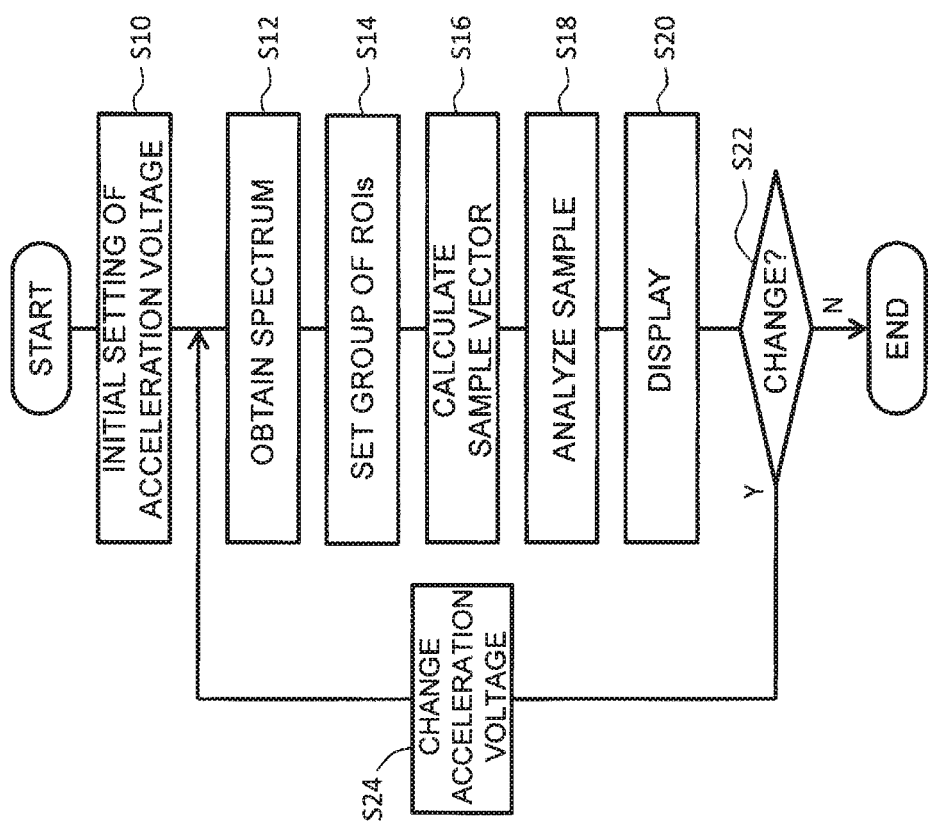
FIG. 7 is a flowchart showing an example operation of an X-ray analysis system.

FIG. 7 shows an example operation of the X-ray analysis system shown in FIG. 1. FIG. 7 may also be viewed as showing an example of an X-ray analysis method according to the present embodiment.

In S10, an initial setting of the accelerating voltage is performed. An initial value of the accelerating voltage is preset or is selected by the user. In S12, the electron beam is irradiated onto the sample, and a spectrum is produced by observation of the X-ray obtained as a result of the irradiation of the electron beam. The spectrum includes the plurality of peaks of interest caused by the electron transitions from the valence band to the inner shells, and the reference peak(s) caused by the electron transition(s) between the inner shells. In S14, the group of ROIs including the plurality of ROIs is set on the spectrum. Alternatively, a plurality of groups of ROIs may be prepared in advance, and a group of ROIs to be used may be selected according to the sample or the spectrum.

In S16, the accumulated value is calculated for each ROI, and the sample spectrum is calculated by normalizing the plurality of accumulated values calculated for the plurality of ROIs by dividing the plurality of accumulated values for the plurality of ROIs by the accumulated value calculated for the reference ROI. In S18, the sample vector is matched with the compound database, to analyze the sample. Specifically, the compound forming the sample is identified. In S20, the analysis result is displayed along with the spectrum or the like. In S22, it is judged whether or not the sequence of steps from S10 is to be repeatedly executed. In S24, it is judged whether or not a change of the accelerating voltage is necessary, and, if such a change is necessary, the accelerating voltage is changed in S24, and then, the steps from S10 are executed. Alternatively, a width of each ROI may be individually set.

Alternatively, the above-described technique may be applied to usages other than the compound determination. For example, based on ratios of Lα and Lβ with respect to L1 and Ln, a quantitative analysis of valence electrons may be executed. For example, the above-described technique may be applied for measurement or evaluation of a property of the valence electron (specifically, an electric characteristic such as the dielectric constant). Various applications are possible for the above-described technique.

The invention claimed is:

1. An X-ray analysis system comprising:
   a production apparatus that produces a spectrum for an X-ray emitted from a sample; and
   an analysis apparatus that analyzes the sample based on the spectrum, wherein
   the spectrum includes a first peak and a second peak, and the analysis apparatus comprises:
      a calculator which calculates characteristic information reflecting a chemical bonding in the sample based on the spectrum, wherein the calculator calculates the characteristics information by normalizing information in a first region of interest to information in a second region of interest;
      an analyzer which analyzes the sample based on the characteristic information; and
      a setter which sets, on the spectrum, the first region of interest for evaluating the first peak and the second region of interest for evaluating the second peak.

2. The X-ray analysis system according to claim 1, wherein
   the spectrum includes a plurality of the first peaks caused by electron transitions from a valence band corresponding to the outer shell to the inner shells,
   the setter sets a plurality of the first regions of interest for evaluating the plurality of the first peaks, and
   the calculator calculates the characteristic information by normalizing a plurality of sets of the information in the plurality of the first regions of interest with reference to the information in the second region of interest.

3. The X-ray analysis system according to claim 1, wherein
   the analyzer is configured to identify a compound forming the sample based on the characteristic information.

4. The X-ray analysis system according to claim 1, wherein
   the X-ray analysis system further comprises a scanning electron microscope, wherein
   the scanning electron microscope irradiates an electron beam onto the sample for obtaining the X-ray,
   wherein the X-ray is a soft X-ray having an energy of lower than or equal to 1 keV, and
   wherein the production apparatus comprises a wavelength dispersing element onto which the X-ray is irradiated, and a detector which detects a dispersive X-ray which is output from the wavelength dispersing element and which spatially spreads.

5. An X-ray analysis method comprising the steps of:
   irradiating, by a scanning electron microscope, an electron beam onto a sample;
   producing, by a production apparatus, a spectrum of an X-ray emitted from the sample; and
   analyzing, with an analysis apparatus, the sample based on the spectrum, wherein the spectrum includes a plurality of peaks of interest, wherein the analysis apparatus comprises a calculator, an analyzer, and a setter, and
   wherein analyzing the sample comprises:
      calculating, with the calculator, characteristic information reflecting a chemical bonding in the sample based on the plurality of peaks of interest;
      analyzing, with the analyzer, the sample based on the characteristic information; and
      setting on the spectrum, with the setter, a first region of interest for evaluating the first peak and a second region of interest for evaluating the second peak.

* * * * *